Sept. 28, 1926.

H. FOERSTERLING

APPARATUS FOR MAKING AIR GAS

Filed Oct. 10, 1925  2 Sheets-Sheet 1

1,601,303

INVENTOR,
Hans Foersterling,
BY
Henry J. Lucke,
ATTORNEY.

Sept. 28, 1926.
H. FOERSTERLING
1,601,303
APPARATUS FOR MAKING AIR GAS
Filed Oct. 10, 1925     2 Sheets-Sheet 2
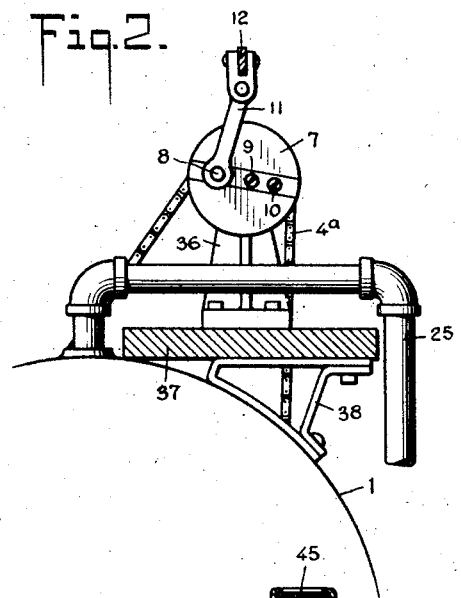
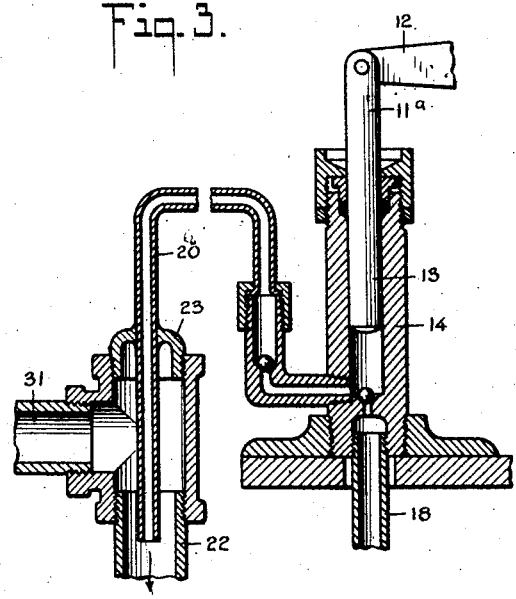
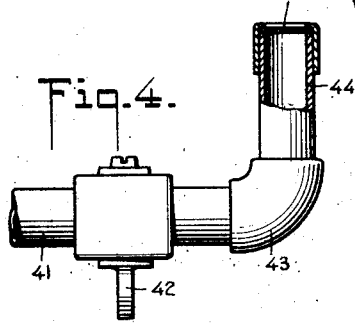
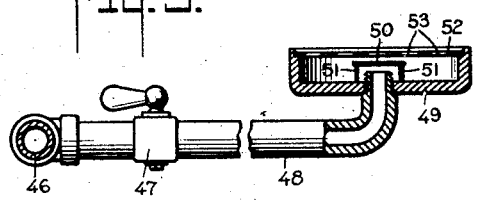
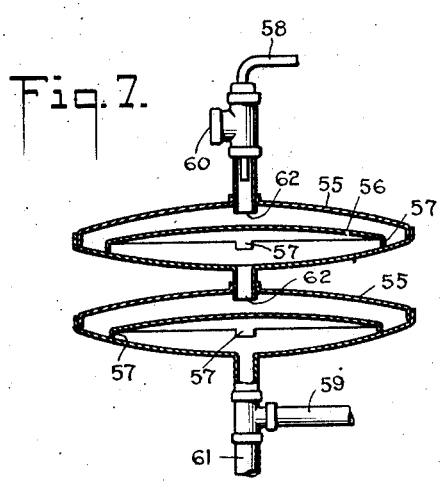
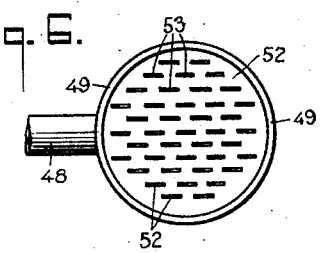

Patented Sept. 28, 1926.

1,601,303

UNITED STATES PATENT OFFICE.

HANS FOERSTERLING, OF JAMESBURG, NEW JERSEY.

APPARATUS FOR MAKING AIR GAS.

Application filed October 10, 1925. Serial No. 61,816.

This invention refers to an improved apparatus for making air gas from an inflammable volatile liquid.

It has been heretofore proposed to make air gas from inflammable liquids, as for instance gasoline, by charging gasoline into a container which acts in a two-fold capacity, firstly, as a storage vessel for same and secondly as a vaporizer. Air is pumped into such container by means of a fan driven by a counterweight or waterwheel, whereby the air becomes saturated with the gasoline vapor and is then usually conducted to a mixing chamber; the resulting airgas mixture is then ready for use. As air takes up at first the more volatile constituents of the gasoline, leaving behind the less volatile constituents, the resulting airgas varies in uniformity by reason of the variation of the proportions of its constiuents and in the effort to overcome this serious defect various kinds of "equalizers" have been designed. However such "equalizers" are more or less complicated, expensive and are unsatisfactory in producing a truly uniform gas. Furthermore, there usually remains in the container a certain amount of unvaporized gasoline which defeats the attainment of a uniform airgas. The above results are derived notwithstanding that the gasoline used in these air gas machines may be of high quality, such as gasoline testing about 85° Bé., which costs about double the price of standard motor gasoline, testing only 58° Bé.

Pursuant to my invention, the gasoline is discharged into a suitable vaporizer at a determined rate of flow and preferably downwardly in the vaporizer as a thin stream; the air is supplied to the vaporizer in a counter direction of flow and preferably upwardly through the vaporizer. The rate of flow of the air is regulated to derive a substantially uniform quality and of the desired degree of heating value. The vaporizer is constructed to provide a radiating surface of sufficient extent to overcome the lowering of the temperature within the vaporizer due to vaporization of the volatile constituents of gasoline, thereby maintaining the surface tension of the gasoline substantially corresponding to the temperature of the air at the location of entrance into the vaporizer. The residue or unvaporized constituents of the gasoline are removed and preferably continuously from the vaporizer.

Further features and objects of the invention will be more fully understood from the following detail description and the accompanying drawings, in which—

Fig. 2 is a section on line 2—2 of Fig. 1, on an enlarged scale;

Fig. 3 is a detail vertical section of one form of gasoline pump and associated parts on an enlarged scale;

Fig. 4 is a detail side elevation, partly in vertical section, of one type of heating burner for the employment of my form of airgas;

Fig. 5 is a detail side elevation, partly in vertical section, of one type of heating burner for the employment of my form of airgas;

Fig. 6 is a top plan view of Fig. 5; and

Fig. 7 is a detail side elevation of a modified form of vaporizer.

Figure 1:
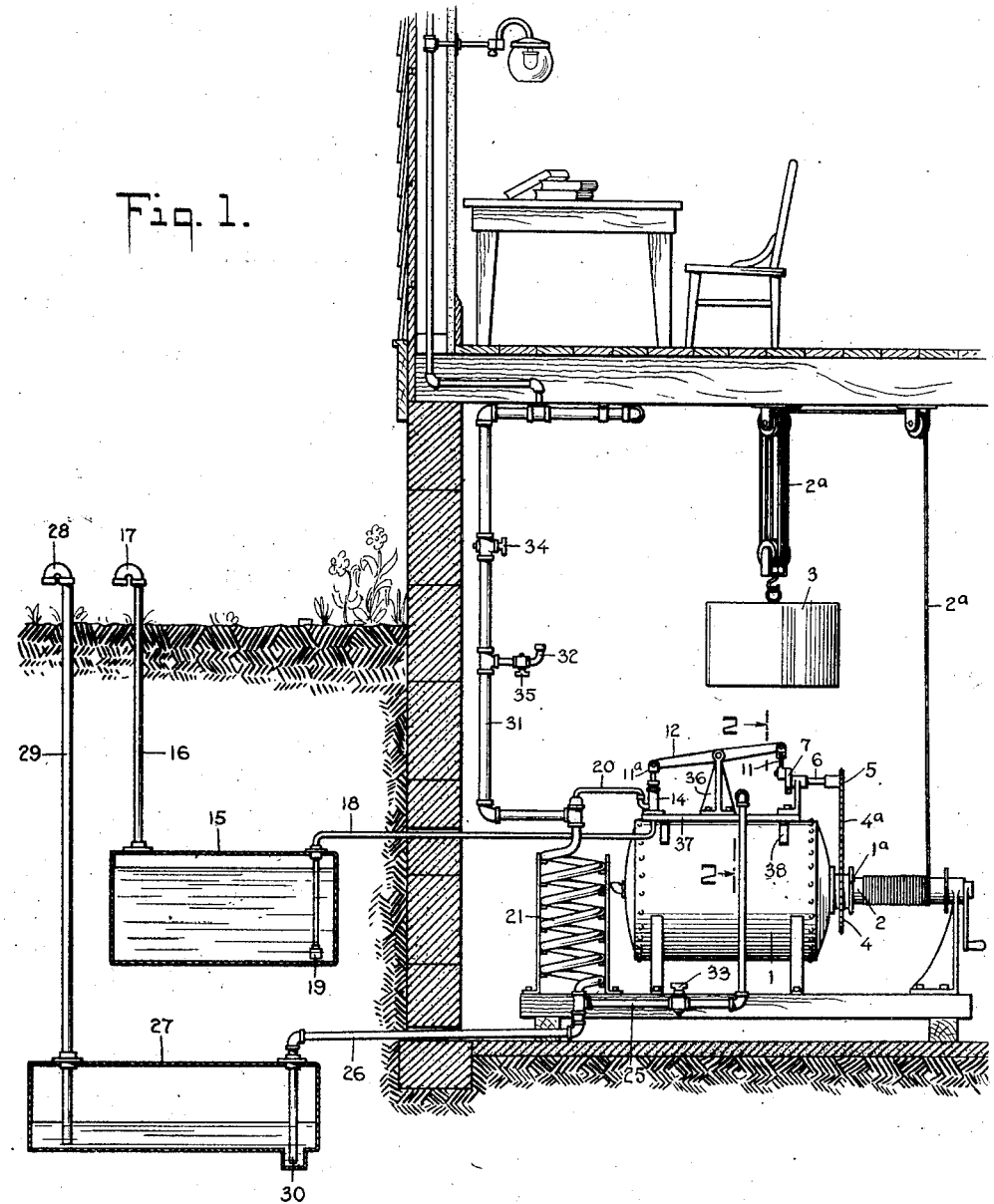
Fig. 1 is a view largely in vertical section and partly in side elevation of one form of my invention.

Referring to Figs. 1 and 2, 1 represents a fan or blower as is commonly used in the manufacture of air gas, the fan or blower 1 is provided at its back with an air intake (not shown) and at its front with an axle connected by suitable means such as the winch 2 actuated by the counterweight 3 by means of the wire rope $2^a$ wound on the winch 2. On the shaft $1^a$ of the internal wheel of the fan or blower, I mount sprocket wheel 4 which drives by means of a chain $4^a$ the sprocket wheel 5 keyed to or otherwise fixed on one end of the countershaft 6. At the other end of the countershaft 6 is secured the eccentric or cam 7. The hub of the ecentric 7 is regulated by means of the keyed slide 8, held in position by two set screws 9, 10 or equivalent. The eccentric 7 drives by means of the lever 11, the rock shaft 12 and lever $11^a$ the piston 13 of the pump 14. 15 represents a storage tank for the inflammable liquid, located preferably underground. The tank 15 is provided with breather pipe 16 which serves at the same time as its filling means upon unscrewing the bend 17. The tank 15 is connected with the pump 14 by means of pipe line 18 provided at its end within the tank 15 with the foot valve 19.

The overflow 20 of pump 14, see Fig. 3, is connected with the coil 21. The intake line 20 of the coil 21 is preferably welded to the nipple 23. The lower end of coil 21 is connected by means of the airline 25 with the outlet of fan or blower 1. By means of the pipeline 26 the bottom of the coil 21 is connected with overflow tank 27. The tank 27 collects the unvaporized residue of the gasoline as described more particularly hereinafter, and is emptied as required by unscrewing the bend 28 from its breather pipe 29. The pipeline 26 is sealed within the tank 27 against the flow of the gas by means of its seal 30. The gasmain 31 is connected to the upper end of the coil 21 as shown and is provided with a test burner 32.

The cock 33 controls the air line 25 leading to the coil 21. The cock 34 controls the main gas line 31 and the cock 35 controls the test burner 32.

I now describe one method of carrying out my invention, but in doing so it must be understood that the same serves merely as an example of illustrating my apparatus and the formation of my airgas.

The fan casing 1 is filled with a suitable sealing fluid to the desired height. The storage tank 15 is filled with standard motor gasoline and enough gasoline is initially poured into storage tank 27 to cover seal 30. The cocks 33, 34 and 35 are now closed. The counterweight 3 is then wound up manually or otherwise. The cock 35 of the testburner 32 is now opened. The fan 1 is set into motion and at the same time the gasoline pump 14 through the gearing including the sprocket wheels 4, 5 pumps gasoline from the tank 15 into the coil 21.

Upon regulating the pump 14, so that it delivers 10 cc. of regular motor gasoline, of a specific gravity of 0.746 or approximately 57° Bé., per 1 cb. ft. of air, passed through the coil 21, the derived gas is of uniform quality, and burns with a blue flame, having a green inner cone, thus indicating complete combustion without any additional air supply.

I have further found that of each 10 cc. of gasoline passed through the coil substantially 3.5 cc. are vaporized and substantially 6.5 cc. are recovered in the storage tank 27.

The recovered gasoline shows specific gravity of approximately 0.776 or 50° Bé. and is usable in a gasoline engine for the production of power.

In carrying out the aforesaid, I used a Tirrill fan having a diameter 13" by a length of 13". The capacity of the fan was tested by a fluid positive gas meter and found to be .75 cb. ft. per revolution. A gasoline pump as adopted for engine work, transferred the gasoline from the storage tank into the coil 21. Its motion was so regulated that for each revolution of the fan it made 4 strokes of the piston. The coil was made of 1" wrought iron pipe, outside diameter of coil measuring 12", 7 complete windings in all and each separated from the other by a distance of 1.2". This allowed a good radiation of the cold produced by the vaporization of the gasoline. With an outside air temperature of 17° C. and running the fan at the rate of 1/2 revolution per minute, the temperature of the airgas produced showed also 17° C., indicating that all of the cold generated had been radiated through the walls of the coil. By using a copper coil instead of an iron one, greater capacities can be easily obtained for greater productions.

From the above, it will be seen that I can produce 1000 cb. ft. of airgas with 10000 cc. of motor gasoline=2.64 gal. and that I actually vaporize 3500 cc.=0.92 gal. and recover 6500 ccm."=1.72 gal. which can be used for other purposes.

Assuming that 1 gal. of vaporized gasoline weighs 6 lbs. and that 1 lb. motor gasoline produces 20,000 B. t. u., then the vaporized gasoline corresponds to 110,400 B. t. u. per 1000 cb. ft., or 110 B. t. u. per one cb. ft.

The claim of the present gas machine manufacturers is that 1000 cb. ft. of air gas are obtained by vaporizing 3 gal. of gas machine gasoline. As this quality of gasoline weighs only 5.5 lbs. per gal. the 3 gal. are equal to 16.5 lbs. which at 20,000 B. t. u.=330,000 B. t. u. or 330 B. t. u. per one cb. ft.

This corresponds well with European practice, where 250 to 300 grams of low boiling gasoline is added per 1 cb. m.=329 B. t. u. per 1 cb. ft. (see Strache: Die Gas Beleuchtung and die Gasindustrie, page 687, Verlag von Friedrich Vieweg & Sohn, Braunschweig, 1913).

It is clear that a gas containing 330 B. t. u. per cb. ft. requires an additional supply of air in order to obtain complete combustion.

From an economical standpoint the following calculation can be made.

One cb. ft. of air will absorb under normal air conditions as they exist for instance in a cellar, from 10 cc. motor gasoline, as it is sold today in the market, from 3–3.5 cc. of the vaporized constituents of gasoline depending on the minor variations of temperature, and resulting in a gas containing approximately 110 B. t. u. But if I add 10 cc. of gas machine gasoline to one cb. ft. of air, then all 10 cc. will be taken up by the air, resulting in a gas of 330 B. t. u.

Motor gasoline is sold today around 20¢ per gal, and gas machine gasoline at 35¢ per gal.

According to present practice 1000 cb. ft. of airgas made from gas machine gasoline contains approximately 330,000 B. t. u. and require 3 gal. at 35¢=$1.05. Hence 10,000 B. t. u. cost 3.2¢.

With my process I produce a gas containing per 1000 cb. ft. of 110,000 B. t. u. for which I require 0.92 gal. at 20¢=0.184. Hence 10,000 B. t. u. cost only 1.67¢ or a saving of nearly 100%.

However the saving in money is not the only advantage, which my invention offers. The principal object of my invention is to furnish to the farmer and for the household located away from the centers of general gas distribution an inexpensive apparatus of such simple design that it can be operated by the average layman without risk of fire or explosion.

As far as the fire risk is concerned, the apparatus has been so designed that the fire risk is practically eliminated. The two storage tanks, the one for the motor gasoline and the other for the residual gasoline are located underground away from the building. Only so much gasoline is lifted from the storage tank and brought into the house as is required in a given time and is then almost instantaneously converted into gas. Considering the fact that only 10 cc. of gasoline per one cb. ft. are used and that an average household burner as is used for kitchen work or for illumination purposes does not require much more than from 20 to 30 cb. ft. per hour, it will be found that the amount of gasoline which is introduced into the house at any given time is infinitesimally smaller than the content of the bottle of gasoline which is found practically in every household for removing spots from clothes or the like.

As far as an explosion risk is concerned, it must be considered that the lower explosion limit of gasoline vapor is 3 to 5 per cent by volume. An air gas containing 3 gal. of gasoline in vapor form per 1000 cb. ft. figures to approximately 8 per cent by volume. While such a gas escaping into a small confined room may cause an explosion, when brought suddenly into contact with a flame or spark, my gas containing less than 1 gal. of gasoline vapor per 1000 cb. ft. simply cannot be ignited when it becomes further diluted with air.

All the gas burners which are used today for kitchen work and illuminating purposes, regardless of whether they are used with air gas or illuminating gas are provided with a means for regulating the supply of air required for complete combustion, as both gases will burn with a yellow flame if air is not added. It is further well understood that the hottest flame, hence the greatest economy, is obtained by regulating the air supply so that the flame shows a greenish center surrounded by a blue mantle. But the practice of actual regulation of gas burners by many housewives and other users of the gas stove by adjusting the flame for maximum heating value, is substantially nil. In general the air regulation is once set and the gas cock is opened more or less depending how fast a pot shall be heated. Very few people will stop to think that the air supply should be regulated every time a gas cock is turned lower or higher. Only the skilled chemist does this in his laboratory.

My apparatus supplies a gas which is regulated inherently, that is, by its own composition to obtain ideal conditions for complete combustion without any further regulation, and, further, these ideal conditions are maintained automatically whenever the machine operates.

For simplicity of assembly, the standard 36 of the rocking beam 12, the pump 14 and the associated parts may be mounted on the platform 37 and supported by a pair of brackets 38 on the casing of the fan or blower 1.

The convolutions of the coil 21 may be held in spaced relation by any suitable frame 39 which is open to the atmosphere to provide the desired radiation. The frame 39 of the coil 21 may be mounted with the fan or blower 1 on the support 40.

I have found that when there is wanted a high flame as it is commonly used in a laboratory, I prefer to use an arrangement as shown in Fig. 4, where 41 indicates the gas main, 42 a regulating cock, 43 an elbow and 44 a nipple provided at its top with a cap of wire gauze 45.

For use in the kitchen and like heating uses, I have constructed a burner as shown in Figs. 5 and 6, where 46 indicates the gas main, 47 the regulating cock, 48 piping to burner, 49 the cast iron burner proper of say about 3″ diameter. A small plate 50 held in position by say the spaced arms 51 serves as distributer. In a recess at the top of the burner 49 rests a perforated plate 52, a top view of which is shown in Fig. 6. I have found that when slots 53 not larger than approximately $\frac{1}{16}''$ by 1.2″ long are provided in the plate 52, and each slot 53 located from the other in staggered position by say ½″, a very good flame distribution is obtained.

Such a burner has the further advantage over the common ring burner, which is often used in the kitchen, that the flame is much more evenly applied over the bottom of the pot to be heated, leaving no dead space in the center, and that it can be so constructed that it can be easily taken apart and cleaned whenever it is necessary.

It is also well understood that the ideal flame for the Welsbach burner is the Bunsen flame. My gas produced by my process gives a bright light when burned with a Welsbach or like mantle, provided, however, that the air supply device is omitted, to prevent the supply of any secondary air to the burner.

The vaporizer may be modified in form and construction as desired to attain the objects of my invention. In Fig. 7, I have shown a device which has proven very effective for my purposes. 55 represent a series of circular shells, having tops and bottoms slightly curved and communicating successively with one another; within each shell is a slightly downwardly curved tray 56, suitably supported on spaced feet 57. Gasoline enters through pipeline 58 and air through the pipeline 59; the air gas leaves through pipeline 60 and the unvaporized gasoline through the pipeline 61. By means of each nipple 62 of a shell 55, the gasoline is carried to the center of its curved tray 56, forming an ever moving thin film over which the air passes in countercurrent direction, resulting in a rapid saturation of the air with the gasoline vapor. The slightly tapering construction of each shell 55 and its relatively large diameter as compared with its height provides for a rapid radiation of the high temperature of the atmosphere to the interior of each shell owing to the reduction of temperature within each shell due to the vaporization of the gasoline. This is of greatest importance especially at low air temperatures. At such times the economy of the whole apparatus rests more or less on this factor, as will be seen from the following table extracted from Landolt-Boernstein Physikalische Tabellen, page 137, Verlag von Julius Springer, Berlin, 1905, and showing the vapor tensions of the principal ingredients of gasoline.

| Temp.°C. | $C_5H_{12}$ | $C_6H_{14}$ | $C_7H_{16}$ |
| --- | --- | --- | --- |
| | Mm. | | |
| −10 | 114 | 25.9 | |
| 0 | 183.2 | 45.45 | 11.45 |
| +10 | 281.8 | 75.0 | 20.5 |
| +20 | 420.2 | 120.0 | 35.5 |

For this reason I prefer to locate the apparatus in the cellar of the house where the temperature changes are the least in extent and occurrence.

It is obvious that the apparatus will stop operating when the weight reaches the floor. For the average farmer and man of moderate means, the use of multiple blocks will reduce the times of winding up the machine so that this work has to be done only once a day or even less. Under certain circumstances a pipecasing can be driven in the ground to allow the weight a greater travel therein.

For the man of greater means or for industrial purposes a waterwheel can be used, or where water could not be used to good advantage a very simple device can be installed whereby the weight when it reaches a certain point on its way downward throws in and closes a switch which starts a small motor connected with a little hoisting apparatus for winding up the rope again until the weight reaches a certain point on its way upward at which the switch is opened to stop the motor.

In either way the apparatus can be made so that it works perfectly automatically, excepting the occasional filling and emptying of the storage tanks.

If for any reason a yellow flame is required, this of course can also be produced with my apparatus by regulating the length of the stroke of the pump by shifting the adjustable hub of the eccentric 7 to the necessary position. It is obvious that in this case the consumption of standard motor gasoline will increase beyond 10 cc. of gasoline per 1 cb. ft. of air.

As far as the farmer is concerned or the man using gas engine motive power he will find it to his advantage to use motor gasoline which is today a universal commodity. He will extract from it such quantities of the lower boiling compounds as he requires for his kitchen or for other household purposes, using the higher boiling compounds for power purposes. Depending on the size of the household, whether the gas is used only for cooking or also for lighting, ironing etc. the consumption of gas will naturally vary. Statistical figures show however that a household of 4 persons will require per year about 500 cb. m., of an illuminating gas of 5000 calories. This would be equal to approximately 10,000,000 B. t. u. per household per year, or 500 lbs. of gasoline per year. These figures refer to European conditions, where the people are of a more saving nature than in our country. If we multiply for our conditions the above figure by 3, I believe we will come closer to a true consumption of B. t. u. for the average American household, which would then amount to 30,000,000 B. t. u. per year=to 1500 lbs. of gasoline or roughly 240 gal. per year or 20 gal. per month. Not considering any saving in fuel by the more economical combustion of the gas by means of my apparatus it would mean that a family of 4 persons could get along with .70 gal. of gasoline per day and figuring with a price of 20¢ per gal. for motor gasoline the cost for cooking and lighting would amount to approximately 14¢ per day as far as the fuel item is concerned.

As the proportion of vaporized gasoline to unvaporized is as 35:65, there would be available for power purposes about 37 gal. per month. As far as the average farmer is concerned, this is an amount which he can easily dispose of between tractor, truck and other motive power work.

It is unnecessary to go here into a discussion of the merits of the use of gas in the household in place of wood which is the common fuel on the average farm. The saving in time and labor the greater convenience of gas, will more than counterbalance the expense for gasoline. It should however be mentioned here the benefit derived from a better illumination in the house, which is a sore point in the average farm-life and from a national economical standpoint, that the efficiency of a gas fired stove is at least 50% whereas the efficiency of a coal fired stove is but 5% or less.

The man who has no use for the unvaporized portion of the motor gasoline, can of course use with my apparatus also gas machine gasoline, in which case the pump should be set so that approximately only 3 cc. of gasoline are sent through the vaporizer for every cb. ft. of air. To those skilled in the art it will be unnecessary to explain how the best results are obtained, for any special type of gasoline. As in this case all of the gasoline will be vaporized, the storage tank for unvaporized gasoline becomes superfluous and can be replaced by a seal pot of small dimensions.

In Fig. 1, I have indicated a simple manner of assembly of a plant embodying my invention, by locating the fan, the coil and the appurtenant parts within the cellar and the gas pipe leading to an upper room to an illuminating burner, and indicating the gas piping also leading elsewhere in the house for cooking and other household purposes. The gasoline storage tank 15 may be expeditiously located in the ground at the side of the house and similarly the residue gasoline collecting tank 27, the breather pipe 16 and its U-bend 17 and the breather pipe 29 and its U-bend 28 of the tanks 15, 27, extending above the level of the ground at convenient locations.

Whereas, I have described my invention by reference to specific forms thereof, it will be understood that many changes and modifications may be made without departing from the spirit of the invention.

I claim.

1. In an apparatus for the production of air gas from a volatile inflammable liquid, the combination of a vaporizer, a storage tank for the liquid to be vaporized, means for feeding said liquid from said storage tank to said vaporizer, said feeding means being disposed at a level higher than said storage tank, means for generating a current of air, means for correlating the discharge of said liquid by said supplying means into said vaporizer to the discharge of air into said vaporizer by said generating means and means for discharging from said vaporizer the unvaporized residue of said liquid.

2. In an apparatus for the production of air gas from a volatile inflammable liquid, the combination of a vaporizer, a storage tank for the liquid to be vaporized, means for supplying said liquid to said vaporizer, means for generating a current of air, means for correlating the discharge of said liquid by said supplying means into said vaporizer to the discharge of air into said vaporizer by said air generating means, radiating means for said vaporizer, and means for discharging from said vaporizer the unvaporized residue of said liquid.

3. In an apparatus for the production of air gas from a volatile inflammable liquid, an air current generator, a vaporizer constructed to maintain the vapor tension of the liquid to be vaporized substantially corresponding to the temperature of the air at the point of entrance into the vaporizer and means for feeding the liquid through the vaporizer in counter direction to the air current.

4. In an apparatus for the production of air gas from the inflammable volatile liquid, a vaporizer, means for conveying the liquid from a reservoir to a vaporizer, an air current generator, means connecting the discharge of said air current generator to said vaporizer, actuating means connecting said conveying means with said air current generator and means regulatable at will for varying the amount of liquid conveyed to said vaporizer.

5. In an apparatus for the production of air gas from an inflammable volatile liquid, a reservoir for said liquid, a vaporizer, means for conveying the liquid from said reservoir to said vaporizer, an air current generator, means for connecting the discharge of said air current generator to said vaporizer, a tank for collecting the unvaporized residues of said liquid, means for connecting said tank with said vaporizer, means for filling said reservoir, means for equalizing the pressure in said reservoir and means for equalizing the pressure in said tank.

6. In an apparatus for the production of air gas from an inflammable volatile liquid, a reservoir for said liquid, a vaporizer, means for conveying the liquid from said reservoir to said vaporizer, an air current generator, means for connecting the discharge of said air current generator to said vaporizer, said vaporizer and said air current generator being disposed at a location of substantially uniform temperature, a tank for collecting the unvaporized residues of said liquid, means for connecting said tank with said vaporizer, means for filling said reservoir, means for equalizing the pressure in said reservoir and means for equalizing the pressure in said tank, said reservoir and said tank being disposed at a location distant from said vaporizer and said air current generator.

In testimony whereof I have signed this specification this nineteenth day of September, 1925.

HANS FOERSTERLING.